United States Patent [19]

Tiemann

[11] 3,801,883

[45] Apr. 2, 1974

[54] SURFACE CHARGE SIGNAL CORRELATOR

[75] Inventor: Jerome J. Tiemann, Schenectady, N.Y.

[73] Assignee: General Electric Company, Schenectady, N.Y.

[22] Filed: June 2, 1972

[21] Appl. No.: 259,262

[52] U.S. Cl. ....... 317/235 R, 317/235 G, 302/221 D

[51] Int. Cl. ........ H01l 11/14

[58] Field of Search ........ 317/235 G

[56] References Cited

UNITED STATES PATENTS 3,623,132 11/1971 Green ........ 317/235

OTHER PUBLICATIONS

Electronic Design "New Surface-Charge Transistor Has High Data Storage Potential," Page 28, Dec. 20, 1970

1971 IEEE International Solid State Circuits Conf. "Charge-Coupled Digital Circuits," by Kosonocky et al., pages 162–163 & 203, Feb. 19, 1971.

*Primary Examiner*—Jerry D. Craig

*Attorney, Agent, or Firm*—Paul I. Edelson; Joseph T. Cohen; Jerome C. Squillaro

[57] ABSTRACT

Electrical charges proportional to a sampled value of an analog signal are transferred between surface-adjacent portions of an information channel in a semiconductor substrate. The direction of charge transfer is responsive to control voltages applied to electrodes insulatingly overlying the substrate. A plurality of such information channels connected electrically in parallel to a source of analog signal energy and to output means sensitive to the direction of charge transfer constitute a correlator circuit when additionally some of the control voltages correspond to the bits of a digital reference word with which the analog signal is to be correlated. A portion of electric charge proportional to a sample of the analog signal is gated into each information channel synchronously with each clock pulse as each sequential bit of the digital reference word is applied to control electrodes. Accordingly, the magnitude of signal charge present at a first portion of the information channels is proportional to the correlation of the analog signal with the reference word and the magnitude of signal charge present at a second portion of the information channels is proportional to the correlation of the analog signal with the complement of the reference word.

14 Claims, 7 Drawing Figures

PATENTED APR 2 1974 3,801,883

SHEET 2 OF 3

SURFACE CHARGE SIGNAL CORRELATOR

This invention relates to signal correlators. More particularly, this invention relates to electric circuit means for computing the correlation between an analog signal and a digital reference word comprising surface charge transistors devices. This invention is related to the copending applications of Engeler and Tiemann, Ser. No. 84,666, filed Oct. 28, 1970, Ser. No. 84,659, filed Oct. 28, 1970, and Ser. No. 130,089, filed Apr. 1, 1971, and the copending application of Engeler, Tiemann, and Baertsch, Ser. No. 137,238, filed Apr. 26, 1971. These related copending applications are assigned to the assignee of the present invention and are incorporated herein by reference thereto.

Signal correlators are useful in many applications in which it is desired to detect the presence of a signal having known characteristics in a unit of received energy. Essentially, these applications involve the recovery of a low level signal from noise. One example of such applications is the identification of radar or sonar targets by the analysis of the returned signal. Very generally, radar and sonar systems operate by transmitting a packet of energy of known characteristics into the environment. The energy propagates from the transmitter at a velocity determined by the form of the energy and the characteristics of the medium through which it is propagated. When the transmitted energy reaches any discontinuity in the propagation medium, i.e., a target, a portion of the energy incident on the target is reflected. A portion of the reflected energy propagates from the target through the medium at the same velocity as that of the transmitted signal, and is received by the receiver of the radar or sonar system. The distance between the system and the target is determined from the time between the transmission of the transmitted energy and the reception of the echo energy returned from the target, and the known velocity of propagation of the energy in the medium. Additionally, it is usual to employ directionally discriminatory transmitting or receiving means whereby the direction from the system to the target may be determined. It will be appreciated that the direction of a target and, except for minor uncertainities occasioned by the inability to precisely identify the leading edge of an echo, the range of a target may be determined from the receipt of an echo without reference to the internal characteristics of the echo signal. The earliest pulsed radar and sonar systems were so employed to provide only range and bearing information on detected targets. In such cases, noise is not usually a significant operational problem. It was soon recognized, however, that additional information could be extracted from the internal characteristics of an echo signal. An example of such additional information, that is particularly of interest here, results from the fact that the shape of the echo signal in both the frequency and time domains is a function of shape of the transmitted signal, which is known, and the geometrical and impedance characteristics of the target. Accordingly, each echo signal contains a "signature" characteristic of the target which may be used to identify it. The information constituting the signature however is of relatively low amplitude. That is to say, the echo from one target looks very like the echo from another target and the variations constituting the signatures of the targets are so small that they are likely to be lost in system and environmental noise and hence not be detectable by the basic radar or sonar systems described above.

One method which has been employed to extract signature information from echoes is to form the cross correlation product between the received echo signal and a locally generated reference representing the echo which would be received from a particular expected target. The value of the cross correlation function computed is indicative of whether or not the reference signature is present in the received signal. A library of such references may be maintained and each received signal correlated with each reference in the library. The identity of the reference providing the largest value of correlation product with the received signal constitutes an identification of the target.

Signal correlators in current use include Fast Fourier Transform (FFT) analyzers, and transversal filter correlators. FFT analyzers are essentially special purpose digital computers and are characterized by being very versatile, very costly, and rather large in size. Transversal filter correlators essentially comprise a multi-tap linear delay line having a plurality of weighted taps and a summing bus for collecting the weighted outputs of the taps. The signal to be analyzed is introduced at one end of the delay line and the reference word is represented by the weighting of the taps and their distribution along the delay line. The output of the summing bus is accordingly indicative of the correlation between the signal and reference. The delay line may be, for example, acoustic, magnetostrictive, piezoelectric, or optoacoustic; the input of the signal to the delay line and the output from the delay line to the taps is by means of an appropriate transducer. The tap weightings may, for example, be provided by electrical resistors of various values. A more detailed discussion of transversal filter correlators may be found in an article entitled "Linear Signal Processing and Ultrasonic Transversal Filters" by W. D. Squire, H. J. Whitehouse, and J. M. Alsop which appeared in IEEE Transactions on Microwave Theory and Techniques, Vol. MTT17, No. 11, at pages 1,020–1,040.

Transversal filter correlators are smaller and less expensive than FFT correlators but lack the versatility of an FFT correlator. A first area of difficulty resulting from the lack of versatility of transversal filter correlators arises from the fact that signal energy once introduced into the delay line propagates along the delay line with a characteristic velocity which is beyond the control of the system. This produces an operating situation in which no output information is provided over relatively long periods of time, when the signal is being compared with references to which there is no correlation, and a short period of time in which correlator output contains data at a very high rate, when the signal and references have a detectable degree of correlation with each other. This results in inefficient system operation because system elements following the correlator must be capable of processing data at the highest rate at which it will be received and will accordingly have idle capability most of the time. One solution may be to provide a data buffer between the correlator output and following system elements; however, a better solution is to provide a correlator in which the speed of propagation of a signal may be controlled by the system so that high speed signal propagation can be employed when low output data rates are being provided by the correlator and signal propagation through the correlator can be slowed down when high degrees of correlation and consequently high density data output from the correlator occurs. A second difficulty in the employment of transversal filter correlators is that, except for some types of optoacoustic transversal filter correlators, the reference word is defined by circuit components and tap positions and is therefore not directly programmably variable. Therefore, at present a system designer must choose between the versatility of an FFT analyzer and the low cost of a transversal filter correlator.

It is accordingly an object of this invention to provide an improved signal correlator comprising surface charge transistor elements.

It is another object of this invention to provide such a signal correlator to form the correlation product between a digital reference word of several thousand bits in length and of a continuous stream of samples of an analog signal.

A further object of this invention is to provide such a signal correlator which does not appreciably degrade the analog signal.

Yet another object is to provide such a signal correlator in which the velocity of signal propagation is controllable.

Another object is to provide such a signal correlator in which the reference word may be readily varied.

A further object is to provide such a signal correlator which is simple and inexpensive to manufacture and is adapted to fabrication by integrated circuit techniques.

Briefly, and in accordance with one embodiment of this invention, there is provided a surface charge correlator transistor comprising a semiconductor substrate having three surface-adjacent charge storage regions. The first and second charge storage regions are separated by a first controllable barrier region and the second and third charge storage regions are separated by a second controllable barrier region. Each barrier region has two independent control means associated therewith. One control means associated with each barrier region is connected to a clock and serves to recollect all charge stored along the semiconductor substrate into the second, or central, charge storage region during a portion of the clock period. The other control means associated with each barrier region receives a bit of the digital reference word and, during another portion of the clock period, causes the charge in the second charge storage region to be delivered either to the first or the third charge storage region depending upon whether the reference word bit is one or zero. The substrate further includes an input diffusion connected to the source of analog signal energy for introducing into the substrate the quantity of charge proportional to the amplitude of the analog signal, and a third barrier region and clocked control means associated therewith for sampling the charge proportional to the analog signal.

In a first alternative embodiment, the two independent control means associated with each barrier region between storage regions are replaced by a single control means. Since the recollection function under control of a periodic clock and the transfer function under control of the bits of the digital reference word are performed at different times, a single control means may be "timed-shared" between the clock output and the digital reference source. In a second alternative embodiment, a second input diffusion and associated barrier region and control means are provided so that both outer charge storage regions receive quantities of charge proportional to the amplitude of the analog signal.

The novel features of this invention sought to be patented are set forth with particularity in the appended claims. The invention, together with further objects and advantages thereof, may be understood from a reading of the following specification and appended claims in view of the accompanying drawings in which:

Figure 1:
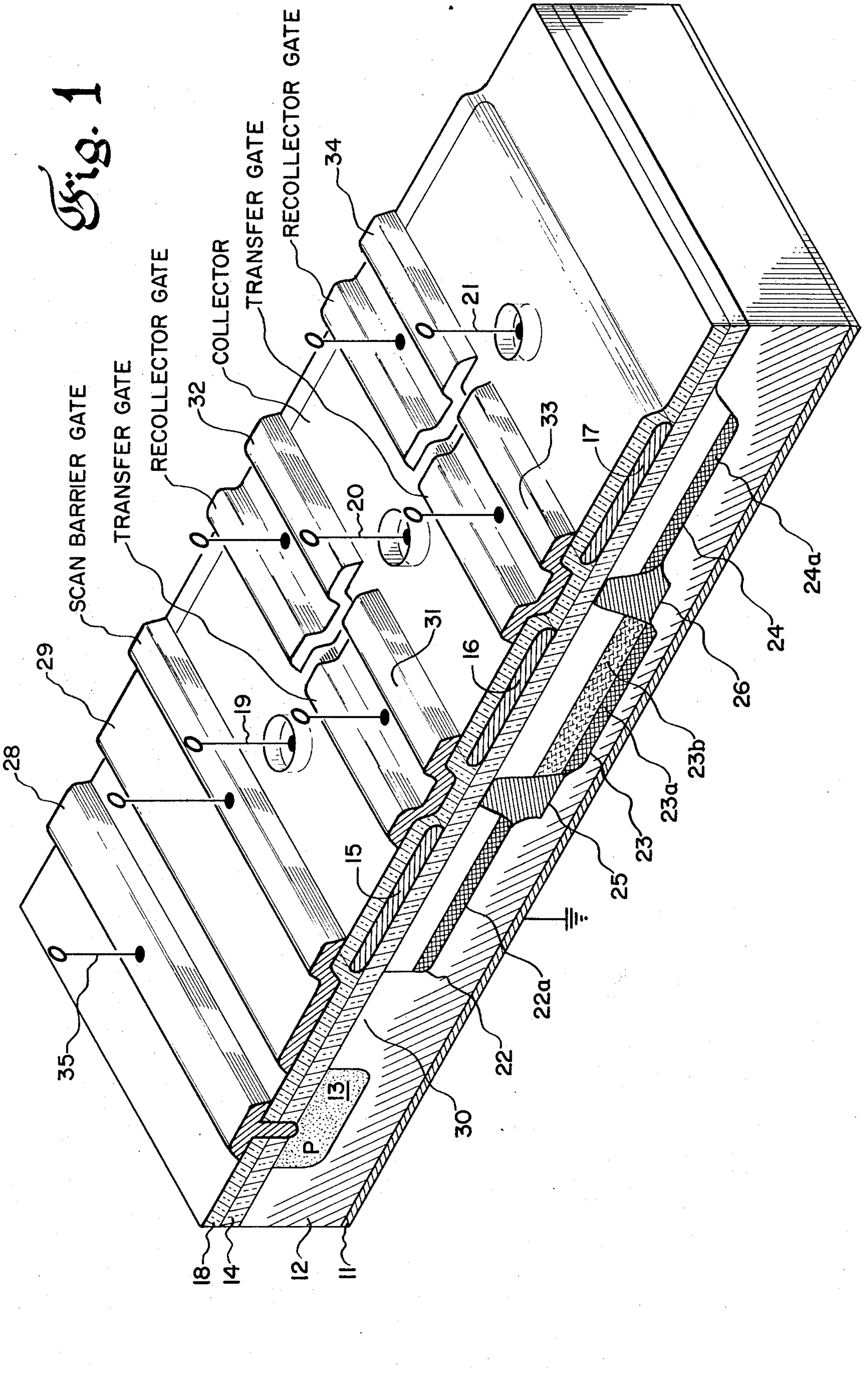
FIG. 1 is an isometric view of a surface charge correlator transistor in accordance with one embodiment of this invention.

FIG. 1 conceptually illustrates a surface charge correlator transistor element. The basic surface charge transistor is described in the aforementioned copending application of Engeler and Tiemann, Ser. No. 84,659. The surface charge correlator transistor of FIG. 1 comprises a metallic base 11 which supports a semiconductor substrate material 12. For the purposes of this example, substrate 12 is assumed to contain n-type dopants and may, for example, be a wafer of n-type silicon. Semiconductor substrate 12 includes therein a region 13 of p-type material. Region 13 provides for input of analog signal energy to the surface charge correlator transistor and is preferably formed by diffusion, and is, for convenience, referred to hereinafter as "diffusion." A first insulating layer 14 overlies semiconductor substrate 12. Three conductor members 15, 16, and 17 are disposed over insulating layer 14 and a second insulating layer 18 overlies insulating layer 14 and conductors 15, 16, and 17. Conductors 15, 16, and 17 are provided respectively with non-rectifying contacts 19, 20, and 21 which penetrate insulating layer 18 to provide means for establishing a potential difference between their respective conductor members and base member 11 which is at ground potential. Conductor members 15, 16 and 17 are disposed generally parallel to each other and to substrate 12 and are separated by a small distance between their mutually facing parallel edges so that application of negative potential to conductors 15, 16, and 17 through contacts 19, 20, and 21 produces carrier depletion regions 22, 23, and 24 with barrier regions 25 and 26 therebetween in surface adjacent portions of substrate material 12.

Conductor member 28 partially overlies insulator 18 and penetrates insulating layers 14 and 18 to provide a non-rectifying contact to diffusion 13. Conductor member 29 overlies insulator 18 and insulatingly overlies a portion of conductor member 15, diffusion 13, and barrier region 30 therebetween. Conductor members 31 and 32 overlie insulator 18 and insulatingly overlie barrier region 25 and facing portions of conductor members 15 and 16. Conductor members 33 and 34 overlie insulating member 18 and insulatingly overlie barrier region 26 and facing portions of conductor members 16 and 17. The conductor and insulating members may be formed of any suitable materials as are known in the art and may to advantage be those materials disclosed in the previously cited copending applications of Engeler and Tiemann.

The analog signal whose correlation with a digital reference word is to be determined is applied to input diffusion 13 through terminal 35 and conductor member 28. The potential energy for minority carriers is made proportional to the amplitude of the analog signal at the p-n junction between input diffusion 13 and substrate 12. When the scan barrier region 30 is lowered by the application of a negative potential to scan barrier gate 29, the potential of depletion region 22 equilibrates with the potential of the input diffusion. When negative potential is removed from scan barrier gate 29, scan barrier region 30 isolates the p-n junction from depletion region 22. Depletion region 22 therefore stores a quantity of charge proportional to the amplitude of the analog signal during a sampling period in which scan barrier 30 was lowered. In the next operational phase, member 16 is made more negative than member 15 resulting in a more negative surface potential and a deeper depletion region 23 underlying member 16 than that of region 22 underlying member 15. A negative potential is then applied to recollector gate 32 lowering barrier region 25 and allowing the mobile signal proportional charge to flow from the less negative region 22. The negative potential is then removed from recollector gate 32 thereby isolating region 22 from region 23. In the next operational phase the potentials applied to contacts 19, 20, and 21 cause members 15 and 17 to be more negative than member 16 resulting in depletion regions 22 and 24 being deeper than region 23. Contacts 19 and 21 are then disconnected from the source of negative potential and members 15 and 17 are allowed to electrically float. A negative potential is then applied to either transfer gate 31 or transfer gate 33, depending upon whether the bit of the digital reference word with which the sample of analog signal is to be compared is a one or a zero. Accordingly, depending upon the reference bit, either barrier region 25 or barrier region 26 is lowered and charge flows into either depletion region 22 or depletion region 24. At this point, the electrical potential of members 15 or 17 drops toward ground by an amount proportional to the total charge transferred to the depletion regions underlying them. Accordingly, the electrical potential present at contacts 19 and 21 represents the correlation between the analog signal sample and the reference word at one contact and the correlation between the analog signal sample and the complement of the reference word at the other contact.

At the next operational phase the potentials producing the depletion regions are again reversed and applied as described above and negative potential is applied to recollector gates 32 and 34 lowering barriers 25 and 26 thereby recollecting the charge into the central depletion region 23. The above process is then repeated for succeeding clock periods. In the preferred embodiment, recollector gates 32 and 34 are driven in parallel since in most cases recollection of charge into the central depletion region 23 is from either region 22 or region 24 depending upon the value of the preceding reference bit. It will be recognized however that in the initial loading of the signal sample recollector gate 32 alone is operationally effective since the initial transfer is known to be from depletion region 22 into depletion region 23. It will be recognized that, as described above, the recollector and transfer gate functions can be performed by a single time shared gate if desired.

When the next sample of analog signal is taken, it is necessary that the last preceding reference word bit have such value that a negative potential is applied to transfer gate 31 lowering barrier region 25 and not lowering barrier region 26 so that the charge proportional to the preceding signal sample is transferred from depletion region 23 to depletion region 22. When the charge has been transferred to region 22, scan barrier gate 29 is again driven negative lowering scan barrier region 30. Charge then flows between the p-n junction and depletion region 22 until potential equilibrium is again achieved. Charge may flow in either direction. Thus, if the amplitude of the analog signal at the time the second sample is taken is lower than the amplitude at the time of the first sample, charge flows from depletion region 22 toward the p-n junction until equilibrium is reached; if the amplitude of the analog signal is higher, charge flows from the p-n junction into depletion region 22 until equilibrium is reached. The negative potential is then removed from scan barrier gate 29 and scan barrier 30 prevents further charge transfer. Therefore, depletion region 22 contains a charge proportional to the amplitude of the second sample of analog signal and the correlation process is repeated as described above.

Alternatively, a second input diffusion with associated conductor member and terminal, and a second scan barrier gate insulatingly overlying a second scan barrier region and a portion of conductor member 17 disposed with respect to conductor member 17 and substrate 12 in a relation of bilateral symmetry to the disposition of the corresponding elements with respect to conductor member 15 and substrate 12 may be provided. If both input diffusions are connected to the analog signal source in parallel and both scan barrier gates are driven in parallel, the value of the last reference bit preceding the taking of a new analog sample is immaterial. In this alternative, the initial analog signal sample is taken when both scan barriers are lowered and is characterized by a flow of charge from each input diffusion into its corresponding surface adjacent depletion region 22 and 24. The lowering of barrier regions 25 and 26 in response to negative potential applied to recollector gates 32 and 34 causes the charge contained in regions 22 and 24 to flow into region 23 as described above. The scan barrier regions are then raised and the charge in region 23 is transferred to region 22 or region 24 in correspondence to the value of the reference bit, and recollected and transferred as described above. Because of the bilateral symmetry, a second sample may be loaded without reference to the value of the last preceding reference bit. When the next signal sample is to be loaded, the charge corresponding to the preceding sample is either in depletion region 22 or depletion region 24 and the process of loading the second sample is characterized by a flow of charge into one of depletion regions 22 and 24 and a flow of charge out of the other of regions 22 and 24 when the scan barriers are again lowered. In addition to obviating the necessity for selecting an appropriate reference bit value prior to loading a new sample of analog signal, this alternative provides for signal gain through the correlator since the signal proportional charge collected in region 23 and transferred to region 22 or 24 in accordance with the value of each successive reference bit is equal to the sum of the charges introduced from the input diffusions into depletion regions 22 and 24.

The portion of semiconductor substrate 12 which underlies conductor members 29, 15, 31, 32, 16, 33, 34, and 17 constitutes an information channel in which the information processing by charge transfer described above is performed. In the preferred embodiment, substrate 12 is substantially larger than the portion shown in FIG. 1 and has a plurality of information channels therein. Each information channel is characterized by having relatively thin insulating layers 14 and 18 overlying substrate 12 and having conductor members corresponding to members 15, 16, and 17, scan barrier gate 29, transfer gates 31 and 33, and recollector gates 32 and 34 of FIG. 1. Insulating layers 14 and 18 are relatively thick over the portions of substrate 12 between adjacent information channels. The input diffusions in substrate 12 extend through the entire substrate and are common to all information channels therein.

It will be realized by those skilled in the art that the illustration of depletion regions 22, 23, and 24 in FIG. 1 describe not only the depth of the depletion regions in semiconductor substrate 12, but also describe the surface potentials at the interface between semiconductor substrate 12 and insulating layer 14 underlying conductor members 15, 16, and 17. In this case, the interface between semiconductor substrate 12 and insulating layer 14 represents a potential of zero volts with respect to ground and the descent of regions 22, 23, and 24 represents increasingly negative potentials with respect to ground. As represented in FIG. 1, regions 22, 23, and 24 are more accurate when viewed as depicting surface potential because the physical depth of depletion regions varies with varying dopant density or other such inhomogeneities in semi-conductor substrate material 12, whereas regardless of such inhomogeneities the surface potentials in substrate 12 underlying conductor members 15, 16, and 17 is uniform as shown.

Figure 2:
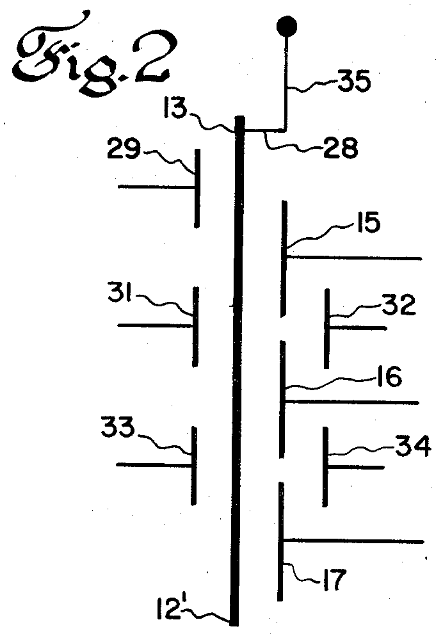
FIG. 2 is a schematic representation of the surface charge correlator transistor of FIG. 1.

FIG. 2 is a schematic representation of a correlator surface charge transistor. A single information channel in the semiconductor substrate is shown as heavy central line 12'. Input diffusion 13 is illustrated schematically by the intersection of line 12' with line 28 representing conductor member 28 of FIG. 1. Scan barrier gate 29 and transfer gates 31 and 33 are illustrated schematically on one side of information channel 12' and conductor members 15, 16, and 17 and recollector gates 32 and 34 are illustrated schematically on the opposite side of information channel 12'.

Figure 3:
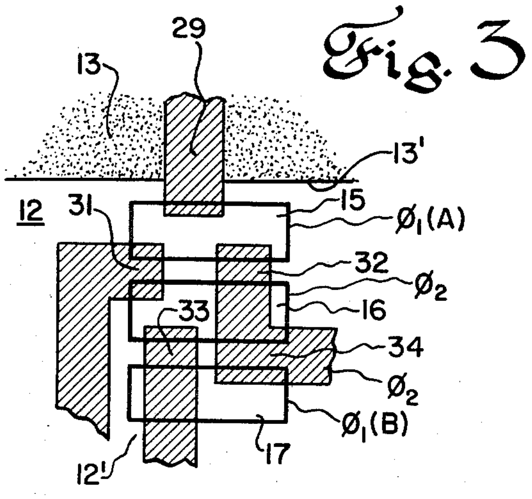
FIG. 3 is a plan view of a correlator surface charge transistor in accordance with this invention.

FIG. 3 is a plan view of a correlator surface charge transistor as illustrated conceptually in FIG. 1 with insulating members 14 and 18 of FIG. 1 omitted for clarity. In FIG. 3 semiconductor substrate material 12 has therein input diffusion 13 and insulatingly overlying thereon conductor members 15, 16, and 17. Information channel 12' is that portion of semiconductor substrate 12 which underlies conductor members 15, 16, and 17. Scan barrier gate 29 permits introduction of charge generated at p-n junction 13' into a depletion region in semiconductor substrate 12 underlying conductor member 15. Transfer gates 31 and 33 control respectively transfer of charge between depletion regions in semiconductor substrate 12 underlying conductor members 15 and 16, and depletion regions in semiconductor substrate 12 underlying conductor members 16 and 17. Recollector gates 32 and 34 are formed from a single conductor member and are driven simultaneously to transfer charge in parallel with the charge transfer operation of transfer gates 31 and 33.

Figure 6:
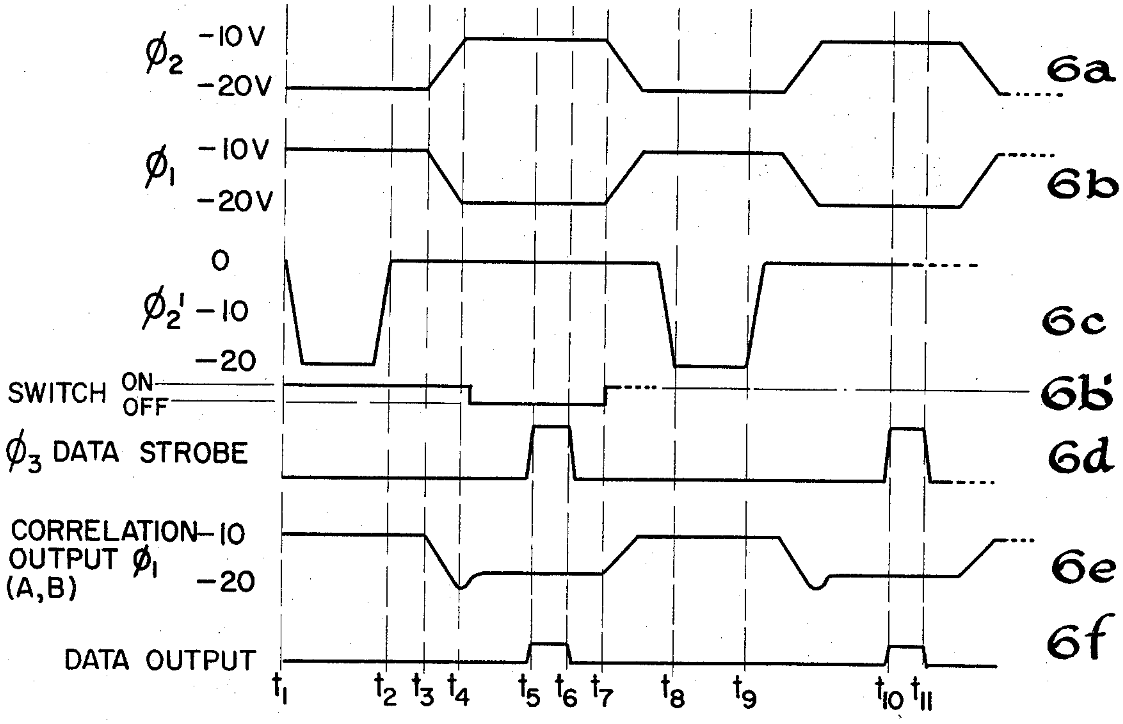
FIG. 6 is a timing diagram useful in understanding signal flow through the signal correlator of this invention.

FIG. 6 illustrates the voltage waveforms associated with the operation of the correlator of this invention. Waveforms 6*a*, 6*b*, 6*b*', and 6*c* illustrate the clock waveforms which provide for the operation of the correlator surface charge transistor of FIGS. 1, 2, and 3 as described above. Waveform 6*a* represents $\phi_2$ clock signal which is applied to conductor member 16 of FIGS. 1, 2, and 3 to produce central charge storage region 23 of FIG. 1. Waveform 6*b* represents $\phi_1$ clock signal which applied in parallel to conductor members 15 and 17 of FIGS. 1, 2, and 3 to produce charge storage regions 22 and 24 of FIG. 1. Waveform 6*b*' represents a switch control waveform which interrupts the application of $\phi_1$ clock to conductor members 15 and 17 thereby allowing them to electrically float so that correlation data may be retrieved. $\phi_1$ and $\phi_2$ are complementary waveforms which vary in amplitude between −20 volts and −10 volts, thereby controlling the depths of the depletion regions underlying the conductor members to which they are applied. Thus, during the time interval $t_1$ to $t_3$ waveform $\phi_2$ has the value −20 volts and waveform $\phi_1$ has the value −10 volts. Depletion region 23 is therefore deeper than depletion regions 22 and 24 in FIG. 1. Accordingly, charge flow upon the lowering of barrier regions 25 and 26 is from depletion regions 22 and 24 into depletion region 23. Waveform $\phi_2'$ illustrated at 6*c* is a clock waveform applied in parallel to recollector gates 32 and 34. At time $t_1$ waveform $\phi_2'$ goes from 0 volts to −20 volts lowering barrier regions 25 and 26 and permitting recollection of charge from depletion regions 22 and 24 into depletion region 23. At time $t_2$ waveform $\phi_2'$ returns to 0 volts and the flow of charge between depletion regions ceases. At time $t_3$ waveform $\phi_2$ goes to −10 volts amplitude and waveform $\phi_1$ goes to −20 volts amplitude. During the period $t_4$ to $t_7$ charge transfer between the depletion regions upon lowering of barrier regions 25 and 26 is from the now shallower region 23 into the deeper regions 22 and 24. During the period $t_4$ to $t_7$ a negative voltage pulse not shown is applied either to transfer gate 31 or to transfer gate 33 depending upon whether the value of the reference word bit occurring in time period $t_4$ to $t_7$ is 1 or 0, and switch waveform 6*b*' causes members 15 and 17 to float. Accordingly, either barrier region 25 or barrier region 26 is lowered for the duration of the reference bit and charge is transferred from depletion region 23 into either depletion region 22 or depletion region 24. Waveforms $\phi_1$ and $\phi_2$ provide for alternation of the direction of charge transfer, inwardly to region 23 or outwardly from region 23 but since neither $\phi_1$ or $\phi_2$ is ever more positive than −10 volts, each of depletion regions 22, 23, and 24 is capable of storing charge at all times. On the other hand, waveform $\phi_2'$ and the voltage pulses responsive to the value of the reference word bits vary between 0 volts and −20 volts thereby providing for complete pinch-off at barrier regions 25 and 26.

It is apparent from the foregoing that the speed of propagation of signals through a correlator constructed in accordance with this invention is controllable by varying the period of waveforms $\phi_1$, $\phi_2$ and $\phi_2'$. Accordingly, by making the frequency of a master clock from which these waveforms are derived inversely responsive to the rate at which data output is provided by the correlator, an object of this invention is achieved in that signal processing is made rapid when there is little detectable correlation between the analog signal and the reference word and processing through the correlator is slowed when higher degrees of correlation are detected. Accordingly, a self-timing correlator is provided and neither excess capacity in following system elements nor a data buffer is required.

At this point, it should be obvious to those skilled in the art that a transversal filter constructed in accordance with the teachings of the aforementioned copending application of Engeler and Tiemann, Ser. No. 130,089 may provide a correlator having many of the advantages of a correlator constructed in accordance with this invention. In that copending application of multi-tap surface charge delay line is disclosed. The velocity of propagation of the signal along a delay line constructed in accordance with the teachings of the copending application is responsive to clock frequency similarly to that in the correlator surface charge transistor of this invention. While a correlator could be so constructed, the embodiment disclosed here is preferred because significantly less degradation of a long signal occurs. As disclosed in the copending applications previously cited, the surface charge transfer process does not provide for the complete transfer of charge between surface adjacent depletion regions. Typically, approximately 1 percent of the charge in a given depletion region remains in that depletion region following the step of transferring charge to the next depletion region. For example, depletion region 23 in FIG. 1 contains a quantity of charge which has been transferred from the outer depletion regions and comprises a quantity of charge represented by 23*b* which will be retransferred to the outer depletion regions at a later portion of the clock cycle and a portion of charge 23*a* which will remain in depletion region 23 because of the incompleteness of the charge transfer process. Depletion regions 22 and 24 contain quantities of charge 22*a* and 24*a* which represent the charge residuum which was not transferred during the preceding recollection step as described above. It will be recognized that the magnitudes of charge portions 22*a*, 23*a*, and 24*a* have been greatly exaggerated in the drawing for purposes of clarity and actually represent approximately 1 percent of the charge storage capacity of the depletion regions. While the phenomenon of the residuum of untransferred charge is not particularly troublesome in applications involving only a few stages of charge transfer, the effect of incomplete charge transfer is cummulative along a long delay line and becomes very significant as the number of transfer stages approaches 1,000. Since in the radar or sonar correlator application it is desired to compare a reference word of several thousand bits in length with a similar number of samples of analog signal, a correlator employing a delay line constructed in accordance with copending application Ser. No. 130,089 would be unusable without means for periodically regenerating the signal along the delay line. In a correlator constructed in accordance with this invention, on the other hand, no significant signal degradation occurs as a result of incomplete charge transfer. Each signal sample is retained in a single information channel assigned to it and a residuum of signal proportional charge left behind on a transfer step, for example, 22*a* in FIG. 1 remains in a depletion region where it will be recombined with the remainder of the signal proportional charge at a later operational step. Therefore, a correlator constructed in accordance with this invention degrades a signal of any arbitrary length by an amount not exceeding the degradation associated with two charge transfer steps, which is insignificant.

Figure 4:
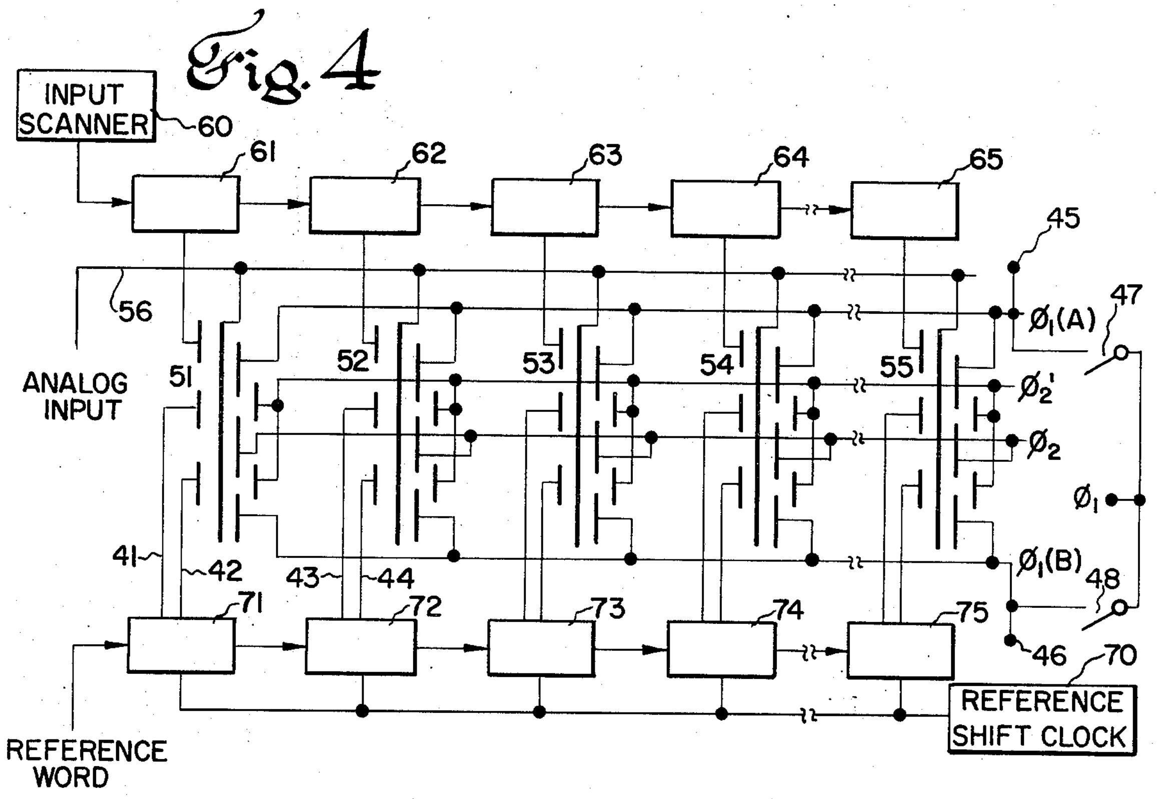
FIG. 4 is an electrical schematic diagram of a signal correlator circuit in accordance with this invention.

FIG. 4 is an electrical schematic diagram of five stages of a correlator circuit in accordance with this invention. The break indicated between the fourth and fifth stages in FIG. 4 is indicative of the fact that approximately 1,000 additional similar stages are included in the actual correlator circuit to be used with a radar or sonar system. The correlator comprises a plurality of surface charge correlator transistors 51, 52, 53, 54, and 55 whose input diffusions are connected electrically in parallel to conductor 56 which carries the analog radar or sonar return signal which is to be analyzed. Input scanner 60 is a clock whose output is propagated along a train of shift registers comprising shift registers 61, 62, 63, 64, and 65. Shift register 61 provides an output to the scan barrier gate of correlator surface charge transistor 51 and an output to shift register 62. Shift register 62 provides an output to the scan barrier gate of correlator surface charge transistor 52 and an output to shift register 63, etc. Each of shift registers 61–65 provides a negative output pulse to the scan barrier gate of its associated correlator surface charge transistor sequentially as a pilot bit from input scanner 60 propagates through the individual shift register. The negative pulse applied to each scan barrier gate lowers the scan barrier insulatingly thereunder and permits a quantity of charge proportional to the instantaneous value of the analog signal on line 56 to be introduced into the information channel of its associated correlator surface charge transistor. A second plurality of shift registers 71, 72, 73, 74, and 75 receive and store the bits of the reference word serially under control of reference shift clock 70. Each of shift registers 71–75 provides an inverting and a non-inverting output. The outputs are provided respectively to the transfer gates of the surface charge correlator transistors. As an example, the first two bits of a reference word may be 1,0. On the first pulse from reference shift clock 70 a bit of value 1 is loaded into shift register 71. Responsive to the bit value 1 shift register 71 provides a −20 volt output on line 41 and a 0 volt output on line 42. At the next pulse from reference shift clock 70 the bit of value 1 is loaded from shift register 71 into shift register 72 and the next bit of reference word of value 0 is loaded into shift register 71. Responsive to the values of the bits stored therein, shift register 71 provides a 0 volt output on line 41 and a −20 volt output on line 42 and shift register 72 provides a −20 volt output on line 43 and a 0 volt output on line 44. This process continues in response to further pulses from reference shift clock 70 until the entire reference word has been loaded one bit in each shift register.

At this point, if desired, the output of the last shift register may be connected to the input of the first shift register so that the reference word will continue to circulate through the system until the entry of a new reference word is desired. The value of each bit of reference word will control the direction of charge transfer from central storage regions to outer storage regions in each information channel of surface charge correlator transistors 51–55. The outer conductor members insulatingly overlying each information channel receive the clock $\phi_1$ as shown in FIG. 6 in parallel, periodically interrupted by the opening of switches 47 and 48 in response to waveform 66'. Switches 47 and 48 are illustrated schematically and may be any suitable switches but are preferably enhancement mode field effect transistors. Each of the central conductor members insulatingly overlying each information channel receive clock $\phi_2$ as shown in FIG. 6 in parallel. Clock $\phi_2'$ as shown in FIG. 6 is provided in parallel to each of the recollector gates of surface charge correlator transistors 51–55. Accordingly, charge proportional to one time division sample of analog signal is stored in each surface charge correlator transistor 51–55 and is transferred among the three charge storage depletion regions therein responsively to recollect the clock $\phi_2'$ and the value of the reference word bit stored in each of shift registers 71–75. Correlation output is obtained between lines $\phi_{1(A)}$ and $\phi_{1(B)}$ at terminals 45 and 46 for example and is represented by a potential with respect to ground which is equal to the biasing potential which created the outer depletion regions less the surface potential produced by the presence of signal proportional charge in the outer depletion regions as discussed above.

The correlation output waveforms observable at $\phi_{1(A)}$ and $\phi_{1(B)}$ of FIG. 4 are illustrated in FIG. 6 at *6e*. Time $t_1$ through $t_3$ is the collection phase as discussed above and the $\phi_{1(A,B)}$ outputs are −10 volts under the influence of clock $\phi_1$. From time $t_3$ to time $t_4$, clocks $\phi_1$ and $\phi_2$ reverse their output levels and at time $t_4$, $\phi_{1(A,B)}$ output level is −20 volts. $\phi_{1(A,B)}$ lines are then electrically floated by the opening of switches 47 and 48. Charge transfer from the central storage region of each information channel to one or the other outer storage region responsive to the value of the reference bit controlling the transfer gates then commences and as charge is transferred the potential on line $\phi_{1(A)}$ or $\phi_{1(B)}$ depending upon the value of the reference bit rises from −20 volts to some value between −20 volts and −10 volts proportional to the sampled value of the analog signal. The potential on the other of lines $\phi_{1(A)}$ and $\phi_{1(B)}$ of course remains at −20 volts. At some time $t_5$, the charge transfer process is essentially complete and the $\phi_{1(A,B)}$ potential has reached a steady state. At this point a periodic clock $\phi_3$ shown in FIG. 6 at *6d* is employed to provide a data strobe for sampling the potential values on lines $\phi_{1(A,B)}$ producing a data output illustrated at 6f. A second data strobe pulse and a second data output sample are shown from times $t_{10}$ to $t_{11}$.

Figure 5:
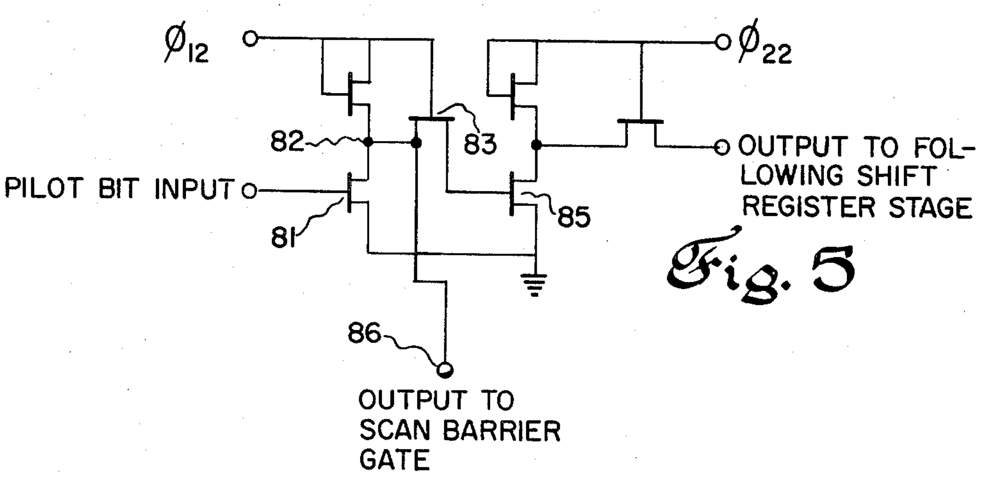
FIG. 5 is an electrical schematic diagram of a shift register circuit which may be used with the signal correlator of FIG. 4.

Shift registers 71–75 may for example comprise dual JK flip-flops type 7473N manufactured by Texas Instruments, Inc., driving amplifiers to provide the required 20-volt control pulses. Shift registers 61–65 may, for example, be constructed in accordance with FIG. 5 in which a pilot bit from the input scanner is received by the gate of field effect transistor 81 pinching off transistor 81 and driving point 82 to −20 volts. Point 82 is connected to terminal 86 to drive a scan barrier gate of a surface charge correlator transistor and admit a quantity of charge proportional to the instantaneous value of the analog signal to the information channel thereof. Clock $\phi_{12}$ resembles clock $\phi_1$ shown at *6b* in FIG. 6 except for example that voltage levels of clock $\phi_{12}$ are zero volts and −20 volts. Accordingly, at an appropriate time $\phi_{12}$ causes field effect transistor 82 to conduct and the −20 volt level present at point 82 is applied to drive field effect transistor 85. The second half of the shift register of FIG. 5 operates in a similar fashion and is driven by a clock $\phi_{22}$ which resembles clock $\phi_2$ shown at *6a* in FIG. 6 except for example that voltage levels of clock $\phi_{22}$ are −20 volts at 0 volts.

Figure 7:
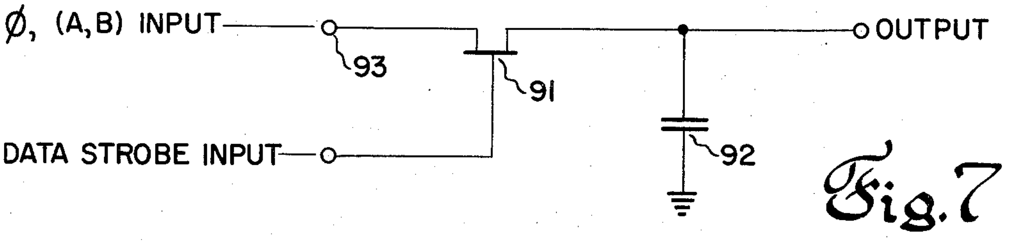
FIG. 7 is an electrical schematic diagram of a sample-and-hold circuit which is useful in connection with the signal correlator circuit of FIG. 4.

FIG. 7 is an electrical schematic diagram of a sample and hold circuit comprising field effect transistor 91 and capacitor 92. Two such sample and hold circuits are included in the correlator of this invention. Terminal 93 of one sample and hold circuit is connected to line $\phi_{1(A)}$ of the correlator of FIG. 4 and terminal 93 of the other sample and hold circuit is connected to line $\phi_{1(B)}$. Terminals 93 connect the $\phi_{1(A,B)}$ correlation outputs to the source electrodes of field effect transistors 91. The $\phi_3$ data strobe waveform shown at *6d* in FIG. 6 is applied in parallel to the gates of field effect transistors 91 causing them to conduct for the duration of the data strobe pulses. Accordingly, capacitors 92 charge to the data output values illustrated at *6f* in FIG. 6 and hold each such value until it is replaced by a new value when the next data strobe pulse again causes field effect transistor 91 to conduct.

In a preferred embodiment to this invention the outputs of the sample and hold circuits are connected to high impedance input terminals of a differential amplifier whose output voltage is therefore proportional to the degree of correlation between the analog signal and digital reference word inputs to the correlator. Alternatively, the output of one sample and hold circuit of FIG. 7 may be employed directly.

While this invention has been described with reference to particular embodiments and examples, other modifications and variations will occur to those skilled in the art, in view of the above teachings. Accordingly, it should be understood that within the scope of the appended claims the invention may be practiced otherwise than is specifically described.

The invention claimed is:

1. A semiconductor device comprising:

a substrate of semiconductor material of a first conductivity type;

a first thin insulating layer overlying said substrate;

first, second, and third adjacently spaced conductor means overlying said first thin insulating layer for forming first, second, and third carrier depletion regions having first and second barrier regions therebetween in said substrate;

a second thin insulating layer overlying said first thin insulating layer and said first second and third conductor means;

first and second control means each respectively overlying said second thin insulating layer and the spacing between said first and second conductor means for controlling said first barrier region;

third and fourth control means each respectively overlying said second thin insulating layer and the spacing between said second and third conductor means for controlling said second barrier region;

a region within said substrate of a second conductivity type, said region of a second conductivity type providing for both injection and removal of charge carriers into and from said first carrier depletion region;

a third barrier region in said substrate between said region of a second conductivity type and said first carrier depletion region; and fifth control means overlying said second thin insulating layer and insulatingly overlying said third barrier region for controlling said third barrier region.

2. The device of claim 1 further including a non-rectifying contact in said region of a second conductivity type for applying an electrical signal to said region of a second conductivity type.

3. A semiconductor circuit module for determining the correlation between an analog signal and a digital reference word comprising:

a substrate of semiconductor material of a first conductivity type having a region of a second conductivity type therein;

a first insulating layer overlying said substrate, said first insulating layer having a plurality of thin insulating areas surrounded by thick insulating areas, said thin insulating areas defining a like plurality of information channels in said substrate;

first, second, and third conductor means over-lying each said thin insulating area for forming first, second, and third carrier depletion regions having first and second barrier regions therebetween in said substrate, said first carrier depletion region and said region of a second conductivity type defining a third barrier region therebetween;

a second insulating layer overlying said first insulating layer and said conductor means;

first control means overlying each said thin insulating area and said second insulating layer and insulatingly overlying said first barrier region for controlling said first barrier region;

second control means overlying each said thin insulating area and said second insulating layer and insulatingly overlying said second barrier region for controlling said second barrier region;

third control means overlying each said thin insulating area and said second insulating layer and insulatingly overlying said third barrier region for controlling said third barrier region;

means for applying said analog signal to said region of a second conductivity type;

means for sequentially applying a voltage to said third control means;

means for serially receiving the bits of said digital reference word and providing voltage levels responsive to the value of said bits;

means for applying said voltage levels to said first and second control means; and means for receiving electrical potential proportional to a quantity of charge contained in said first carrier depletion region, said electrical potential being proportional to the correlation between said analog signal and said digital reference word.

4. The circuit of claim 3 further including:

means for receiving electrical potential proportional to a quantity of charge contained in said third carrier depletion region; and means connected between said means for receiving said electrical potentials for computing the difference in magnitude between said electrical potentials.

5. The circuit of claim 4 wherein said means for computing the difference in magnitude between said electrical potentials includes a differential amplifier.

6. The circuit of claim 3 wherein said means for applying said analog signal to said region of a second conductivity type includes a non-rectifying contact in said region of a second conductivity type.

7. The circuit of claim 3 wherein said means for sequentially applying a voltage to said third control means comprises:

means for periodically generating voltage pulses; and shift register means for receiving said voltage pulses and for sequentially applying said voltage pulses to said third control means.

8. The circuit of claim 3 wherein said means for serially receiving the bits of said digital reference word and providing voltage levels responsive to the value of said bits includes a plurality of serially interconnected shift registers.

9. The circuit of claim 8 wherein each shift register of said plurality of serially interconnected shift registers has an inverting output and a non-inverting output, each said inverting output being connected to one said second control means and each said non-inverting output being connected to one said first control means.

10. The circuit of claim 3 wherein said means for receiving electrical potential includes a sample and hold circuit comprising:

a capacitor having two conducting plates separated by a layer of insulting material, one of said conducting plates being connected to electrical ground; and switch means connected to the other of said conducting plates for periodically connecting said other conducting plate to said first conductor means.

11. The circuit of claim 3 further including:

clock means for periodically raising and lowering said first and second barrier regions.

12. A signal correlator circuit comprising:

a semiconductor substrate having a plurality of information channels therein, each said information channel having means defining first, second, and third charge storage regions therein;

means responsive to a first periodic waveform for introducing each of a plurality of quantities of electrical charge, each said quantity of electrical charge being proportional to a corresponding one of a plurality of time division samples of an analog signal, into said first charge storage region of a corresponding one of said plurality of information channels;

means responsive to a second periodic waveform for transferring said quantities of charge from said first charge storage regions to said second charge storage regions;

means including a shift register responsive to a digital word for transferring said quantities of charge from said second charge storage regions to said first charge storage regions when a bit of said digital reference word has a first value and for transferring said quantities of charge from said second charge storage regions to said third charge storage regions when a bit of said digital reference word has a second value; and means for measuring the quantity of charge in said first charge storage regions.

13. The correlator circuit of claim 12 further including:

means for measuring the quantity of charge in said third charge storage regions; and means for computing the difference between the quantity of charge in said first charge storage regions and the quantity of charge in said third charge storage regions.

14. A signal correlator circuit comprising:

a semiconductor substrate having a plurality of information channels therein, each said information channel having means defining first, second, and third charge storage regions therein;

means for introducing a quantity of electrical charge proportional to one time division sample of an analog signal into said first charge storage region of one said information channel and for introducing a second quantity of electrical charge proportional to another time division sample of said analog signal into said first charge storage region of another said information channel, whereby a plurality of samples of said analog signal are assigned to and stored in said plurality of information channels on a one-for-one basis;

means for transferring said quantities of charge from said first charge storage regions to said second charge storage regions;

means for transferring said quantities of charge from said second charge storage regions to said first charge storage regions when a bit of a digital reference word has a first value; means for transferring said quantities of charge from said second charge storage regions to said third charge storage regions when a bit of a digital reference word has a second value; and means for measuring the quantity of charge in said first charge storage regions.

* * * * *